(12) United States Patent
Lin et al.

(10) Patent No.: US 10,859,677 B2
(45) Date of Patent: Dec. 8, 2020

(54) LASER SCANNER FOR MOTOR VEHICLES

(71) Applicant: VALEO Schalter und Sensoren GmbH, Bietigheim-Bissingen (DE)

(72) Inventors: Lin Lin, Bietigheim-Bissingen (DE); Peter Horvath, Bietigheim-Bissingen (DE); Thomas Schuler, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 261 days.

(21) Appl. No.: 15/758,507

(22) PCT Filed: Sep. 2, 2016

(86) PCT No.: PCT/EP2016/070707
§ 371 (c)(1),
(2) Date: Aug. 2, 2018

(87) PCT Pub. No.: WO2017/042097
PCT Pub. Date: Mar. 16, 2017

(65) Prior Publication Data
US 2018/0329038 A1    Nov. 15, 2018

(30) Foreign Application Priority Data

Sep. 8, 2015  (DE) .................. 10 2015 115 011

(51) Int. Cl.
*G02B 26/08* (2006.01)
*G01S 7/481* (2006.01)
(Continued)

(52) U.S. Cl.
CPC .......... *G01S 7/4817* (2013.01); *G01S 7/4815* (2013.01); *G01S 17/931* (2020.01); *G02B 26/0833* (2013.01); *G02B 26/105* (2013.01)

(58) Field of Classification Search
CPC .... G01S 7/4817; G01S 17/931; G01S 7/4815; G01S 7/481; G02B 26/105; G02B 26/0833; G02B 26/08
See application file for complete search history.

(56) References Cited

U.S. PATENT DOCUMENTS

| 9,395,541 B2 * | 7/2016 | Fujikawa ........... G02B 27/0101 |
| 2006/0158713 A1 | 7/2006 | Takeuchi et al. |

(Continued)

FOREIGN PATENT DOCUMENTS

| DE | 10 2005 055 572 B4 | 8/2007 |
| DE | 102013009673 A1 | 12/2014 |
| DE | 102014109240 A1 | 1/2015 |

OTHER PUBLICATIONS

International Search Report issued in PCT/EP2016/070707 dated Dec. 8, 2016 (2 pages).

(Continued)

*Primary Examiner* — Euncha P Cherry
(74) *Attorney, Agent, or Firm* — Osha Bergman Watanabe & Burton LLP

(57) ABSTRACT

The invention relates to a laser scanner (1') for motor vehicles, having at least two optical transmitters (12, 13, 14) for emitting in each case one transmitted light beam (3, 4, 5), and a rotatably arranged micromirror (6) for deflecting the transmitted light beams (3, 4, 5) onto the scene to be measured. The laser scanner additionally comprises an optical deflecting device, which is arranged in the beam path of at least one transmitted light beam (3, 4, 5) upstream of the micromirror (6) and is configured and arranged such that the transmitted light beams (3, 4, 5) are guided onto the micromirror (6).

Figure 1:
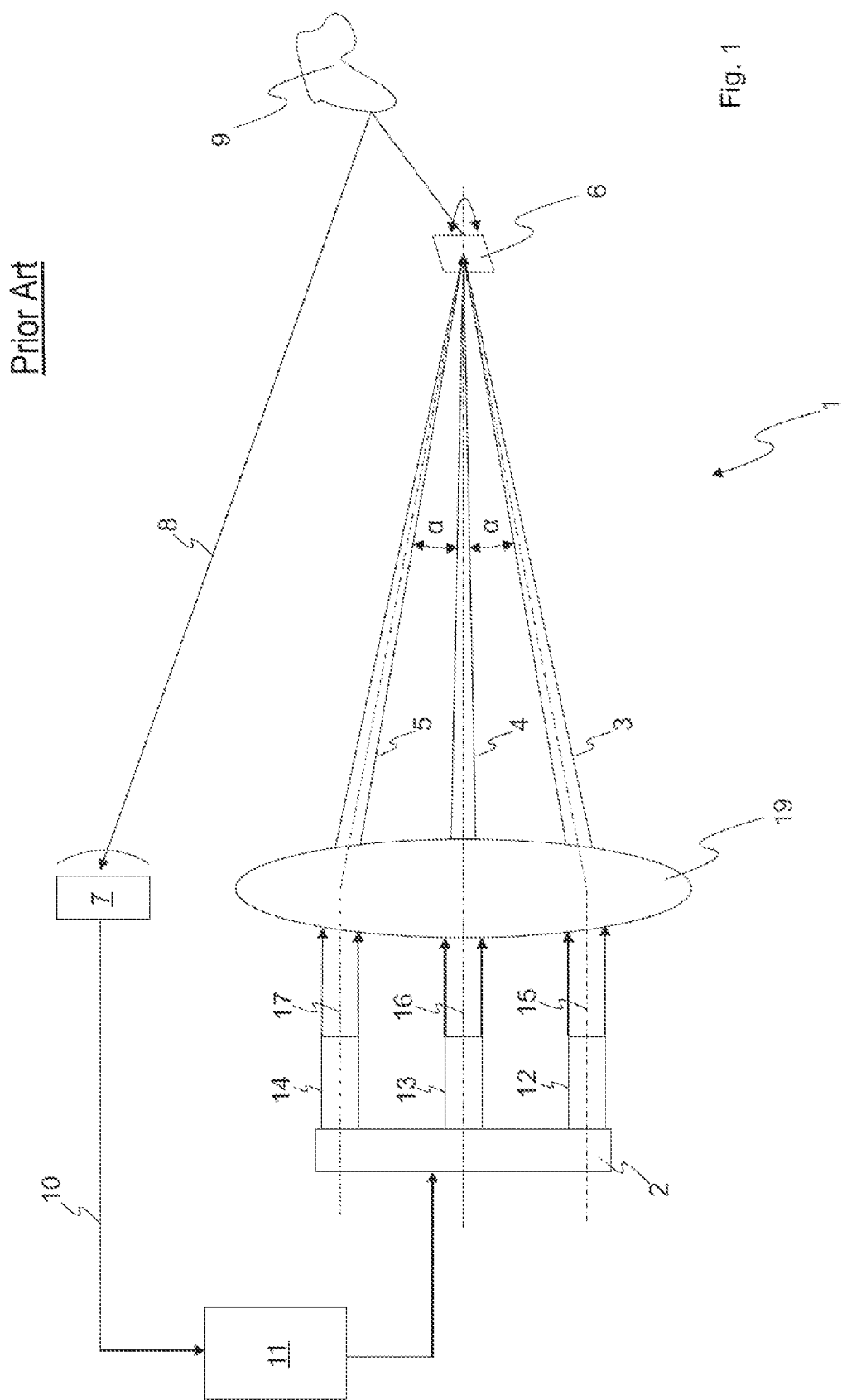

In order to direct in a laser scanner a plurality of transmitted light beams onto the micromirror with as little distortion as possible, provision is made according to the invention for (Continued)

the deflecting device (20) to have at least one deflecting mirror (21, 22) arranged in the beam path of a transmitted light beam (3, 4, 5).

5 Claims, 3 Drawing Sheets

(51) Int. Cl.
*G01S 17/931* (2020.01)
*G02B 26/10* (2006.01)

(56) References Cited

U.S. PATENT DOCUMENTS

| | | |
|---|---|---|
| 2010/0046057 A1 | 2/2010 | Shyu et al. |
| 2013/0001834 A1 | 1/2013 | El-Siblani et al. |
| 2014/0313519 A1 | 10/2014 | Shpunt et al. |
| 2015/0009485 A1 | 1/2015 | Mheen et al. |
| 2015/0042542 A1 | 2/2015 | Fujikawa et al. |
| 2015/0204977 A1 | 7/2015 | Sakai |

OTHER PUBLICATIONS

Written Opinion of the International Searching Authority issued in PCT/EP2016/070707 dated Dec. 8, 2016 (8 pages).
German Search Report issued in DE 10 2015 115 011.5 dated May 2, 2016 (10 pages).
European Office Action in corresponding European Application No. 16 763 001.1, dated Jan. 29, 2020 (6 pages).

* cited by examiner

LASER SCANNER FOR MOTOR VEHICLES

The invention relates to a laser scanner for motor vehicles in accordance with the preamble of Claim 1.

In the automobile field, a wide variety of driver assistance systems are used, that is to say electronic auxiliary devices for supporting the driver in specific driving situations. Many driver assistance systems take into account information relating to objects in the environment of the motor vehicle. A widespread optical measurement method for locating and measuring the distance of objects in space is known under the name "LIDAR" ("light detection and ranging"). LIDAR systems operate in accordance with the time-of-flight method ("time-of-flight measurement"). In these methods, light pulses are emitted and reflected at an object that may be present, with the time until the reception of the reflected signal being proportional to the distance.

In a laser scanner, the emitted laser pulses are deflected via a pivotable mirror arrangement such that scanning of the field of view of the laser scanner is effected within a scanning angle region. DE 10 2005 055 572 B4 discloses a laser scanner which has a laser as the optical transmitter and a detector as the optical receiver. Upon receiving a reflected beam, the detector produces an electrical reception signal. If an evaluation device identifies an echo in the reception signal, this is in principle due to reflections at a target object of the environment. The known laser scanner comprises a deflecting mirror arrangement which has a deflecting mirror that is drivable about an axis of rotation. Due to the rotational movement of the deflecting mirror, the transmitted light beams from the optical transmitter are emitted in angular increments into the scene to be measured.

For a high scanning speed and thus a short reaction time of the laser scanner, it is furthermore known to use a micromirror, also referred to as MEMS mirror, for emitting the transmitted light beams into the environment. The micromirror consists of a multiplicity of individual elements, in which each individual micromirror has a pivotable reflective surface. DE 10 2013 009 673 A1 discloses a laser scanner having a light deflecting unit which is a micromirror that is pivotable about at least one axis, preferably two mutually perpendicular axes. The micromirror of the known laser scanner is part of a MEMS device and is pivotable using a plurality of what are known as comb drives. The micromirror is adjustable at relatively high speeds and simultaneously with a high precision, as a result of which a high scanning speed and thus a short reaction time of the laser scanner is intended to be achieved.

Since all transmitted light beams must be directed onto the relatively small micromirror, generally a deflecting device which is arranged in the beam path of at least one transmitted light beam upstream of the micromirror is provided in laser scanners having a plurality of measurement channels, i.e. at least two optical transmitters for emitting one transmitted light beam each. To this end, a convex lens is traditionally used. However, lenses of this type must typically have a large aperture. It is additionally desirable if the angular distance between the transmitted light beams from the optical transmitters is as large as possible, even though this makes necessary a short focal length of the lens. However, physical boundaries are imposed on the demands for a large aperture and simultaneously small focal length. Another disadvantage in deflecting the transmitted light beams onto the micromirror using a convex lens is the unavoidable disadvantageous influence of the lens on the characteristics of laser beams, in particular due to distortion.

The present invention is based on the object of directing, in a laser scanner having a plurality of transmitted light beams, said light beams onto a micromirror with as little distortion as possible.

This object is achieved according to the invention by way of a laser scanner having the features of Claim 1. Provision is made according to the invention for the deflecting device to have a deflecting mirror arranged in the beam path of a transmitted light beam for deflecting said transmitted light beam. The deflecting mirror reflects the incident transmitted light beam without loss or distortion. The deflecting mirror is arranged and oriented such that the incident transmitted light beam is guided to the micromirror. The deflecting mirror according to the invention for a transmitted light beam offers a large degree of freedom in terms of the geometric arrangement of the optical transmitters and the deflecting device. One or more optical transmitters can here be directed onto the micromirror, and others that have an optical axis which is not directed onto the micromirror are deflected onto the micromirror via deflecting mirrors.

In an advantageous embodiment of the invention, the deflecting device has a deflecting mirror for each of the transmitted light beams assigned to it. If one of the optical transmitters is directed, by way of its optical axis, onto the micromirror, then a respective deflecting mirror is assigned to each further optical transmitter.

The optical transmitters are advantageously arranged in a row, wherein a deflecting mirror is assigned to each of the outwardly located transmitters and the central optical transmitter is directed onto the micromirror. In this way, an angular distance between mutually neighbouring transmitted light beams that is advantageous for the scanning operation is obtained via the outwardly located deflecting mirrors. By arranging the optical transmitters in a row, the transmitted beams from the optical transmitters are located in a common scanning plane. If further optical transmitters are arranged outside the plane, scanning operations with elevation can be realized. The deflecting mirrors according to the invention here produce the desired angular distance of the transmitted light beams from the respectively neighbouring transmitted light beam. Advantageously, the deflecting mirrors of the plurality of optical transmitters are arranged and oriented relative to the respectively assigned optical transmitter such that the transmitted light beams are reflected onto the micromirror at the specified angular distance from the neighbouring transmitted light beam.

The deflecting mirrors are advantageously situated, as a reflector, on a side of the micromirror that is remote from the optical transmitter. The reflector, which is formed by the deflecting mirrors, reflects the transmitted light beams onto the micromirror, which is arranged closer to the optical transmitters, wherein the transmitted light beams are ultimately reflected by the micromirror into the environment to be measured in accordance with the adjustment of the micromirror. The deflecting mirrors, which are arranged as a reflector, are inclined, such that the micromirror can be arranged next to the beam path, for example above the beam path, of the transmitted light beams between the optical transmitter and the reflector.

The optical transmitters are advantageously configured in the form of lasers.

In a particularly advantageous embodiment of the invention, a collimator lens is arranged downstream of each optical transmitter. The collimator lens, which is also referred to as a converging lens, focuses the incident transmitted light beams. The desired field of view ("FOV") and the resolution of the LIDAR system can be determined via the configuration of the collimator lenses.

Figure 2:
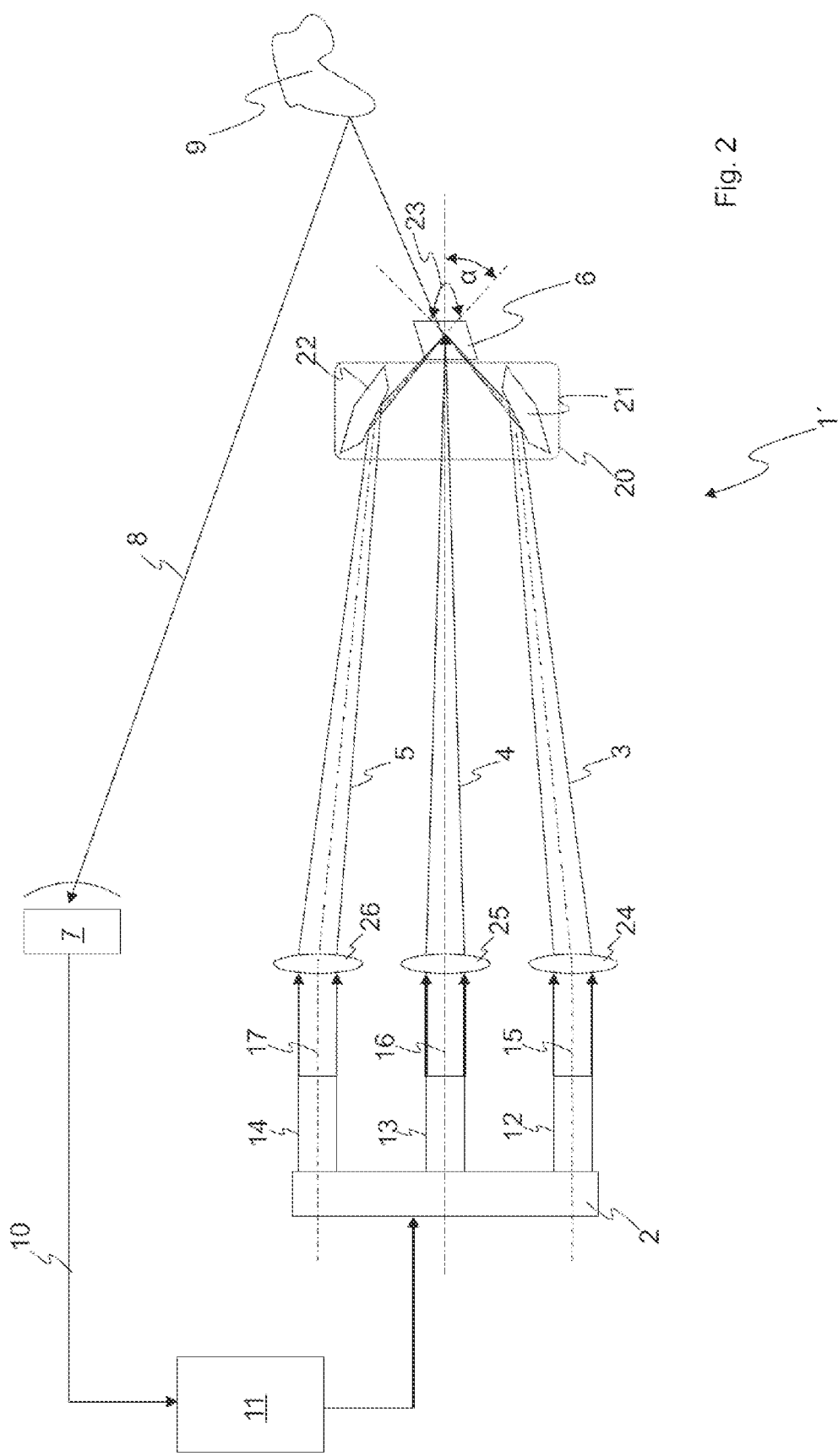
Figure 3:
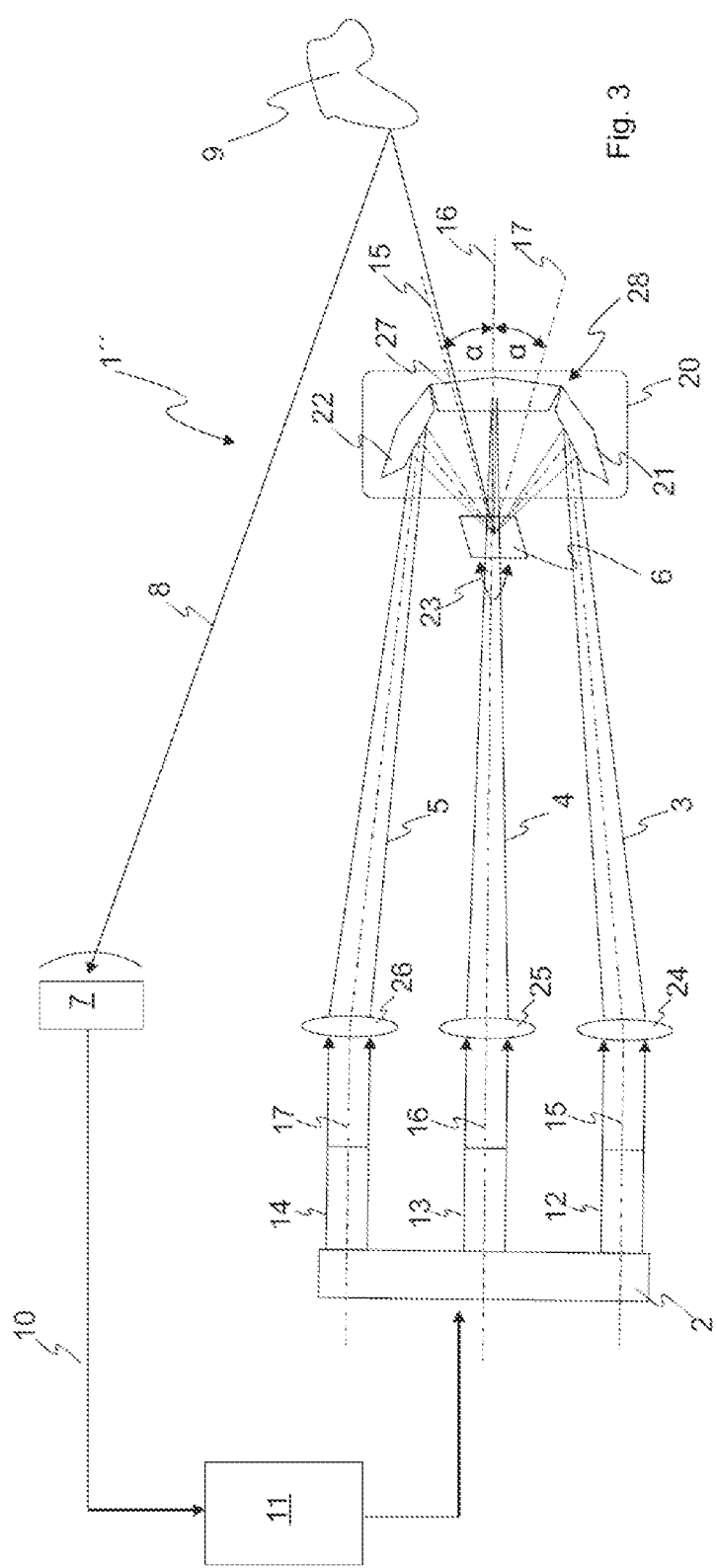
Figure 4:
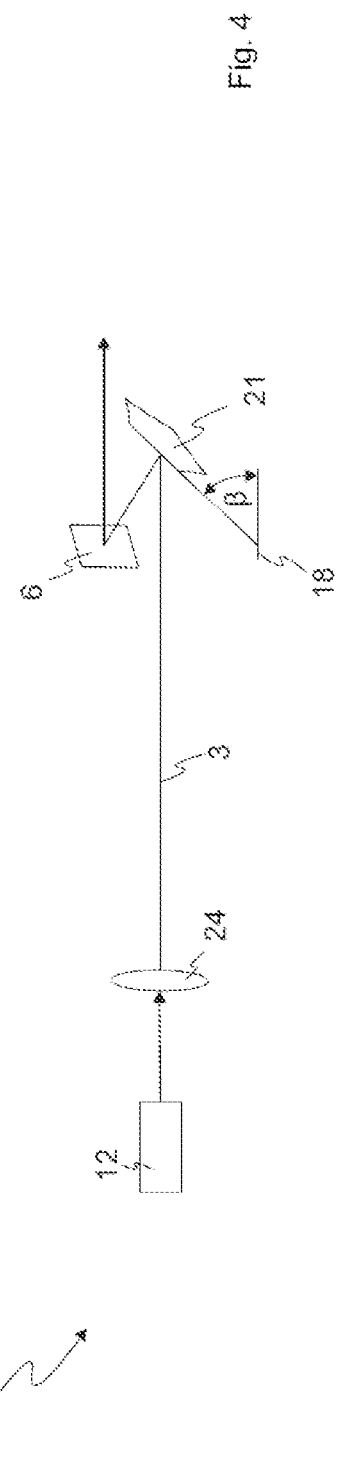

Exemplary embodiments of the invention will be explained in more detail below with reference to the drawing. In the figures:

FIG. 1: shows a schematic illustration of a laser scanner having a micromirror and a deflecting device for the transmitted beams in accordance with the prior art, FIG. 2: shows a first exemplary embodiment of a laser scanner according to the invention having a micromirror and a deflecting device for the transmitted beams, FIG. 3: shows a schematic illustration of a laser scanner having a micromirror and a second exemplary embodiment of a deflecting device according to the invention for the transmitted beams, FIG. 4: shows a schematic side view of the laser scanner in accordance with FIG. 3.

FIG. 1 shows a schematic view of a laser scanner 1 in accordance with the prior art. The laser scanner 1 is part of a LIDAR system and comprises a transmitting unit 2 for emitting transmitted light beams 3, 4, 5, which are deflected by a micromirror 6 onto the scene to be measured. The laser scanner 1 additionally includes a receiving unit 7 for receiving reflected beams 8 that were reflected at objects 9 in the environment of the laser scanner 1.

The receiving unit 7 has photoelectric detectors 10, which, upon incidence of a reflected beam 8, produce an electrical detection signal 10 that corresponds to the reflected beam 8. The detection signal 10 is fed into a control unit 11. The control unit 11 controls the optical transmitters 12, 13, 14, which emit the transmitted light beams 3, 4, 5, and ascertains information relating to the spatial orientation and distance of the object 9 in accordance with the time-of-flight method, while taking into account the detection signals 10. The laser scanner 1 has a multichannel configuration and a plurality of optical transmitters, namely three optical transmitters 12, 13, 14 in the exemplary embodiment illustrated. The optical transmitters 12, 13, 14 are configured in the form of lasers. The optical transmitters 12, 13, 14 are arranged in a row, with the respective optical axes 15, 16, 17 of the lasers being approximately parallel. In order to deflect the initially parallel transmitted light beams 3, 4, 5 onto the common micromirror 6, a convex lens 19 is arranged as an optical deflecting device in the beam paths of the transmitted light beams 3, 4, 5. All transmitted light beams 3, 4, 5 pass through the deflecting lens 19. The physical properties of the deflecting lens 19 are selected, and the deflecting lens 19 is arranged while taking account of the distances between the optical axes 15, 16, 17, such that the transmitted light beams 3, 4, 5 are directed at the relatively small effective mirror surface of the micromirror 6. The correction due to the deflecting lens 19 directs the transmitted light beams 3, 4, 5 at angular distances α with respect to one another onto the micromirror 6, wherein the micromirror 6 transmits the transmitted light beams 3, 4, 5 into the environment at corresponding angular distances α.

FIG. 2 shows a laser scanner 1' according to the invention, in which a deflecting device 20 for directing the transmitted light beams 3, 4, 5 onto the micromirror 6 comprises the arranged deflecting mirror 21, 22 rather than a deflecting lens 19 in the beam path of the transmitted light beams 3, 4, 5. The optical transmitters 12, 13, 14 are arranged in a row, that is to say in a common plane, with the optical axes 16, 17, 18 being parallel. Assigned to the two outer transmitted light beams 3, 4, 5 is in each case a deflecting mirror 21, 22, which directs the respective transmitted light beam 3, 5 onto the micromirror 6. The optical transmitter 13, which is situated centrally in the row of optical transmitters 12, 13, 14, is directed directly onto the micromirror 6 between the deflecting mirrors 21, 22. The two outwardly arranged deflecting mirrors 21, 22 guide the respective transmitted light beams at the desired angular distance α from the respectively neighbouring transmitted light beam 3, 4, 5 onto the micromirror 6, which reflects the transmitted light beams 3 for scanning the environment at the corresponding angular distances α.

The micromirror 6 consists of a multiplicity of individual mirror elements, which have a tiltable reflective surface each. The micromirror 6 is movable in a rotational direction 23, wherein the rotational movement for scanning the environment is controlled by the control unit 11, or the position of the micromirror 6 or/and the angular increments during scanning of the environment are communicated to the control unit 11.

Arranged downstream of each of the optical transmitters 12, 13, 14, which are configured as lasers, is a respective collimator lens 24, 25, 26. Selected and arranged here are collimator lenses 24, 25, 26 that have physical properties that adjust the desired divergence of the transmitted light beams 3, 4, 5 in cooperation with the deflecting mirrors 21, 22, or contribute to a divergence with the desired angular distance α.

As far as the remaining setup of the laser scanner 1' according to the invention is concerned, it corresponds to the setup of the laser scanner 1 in accordance with FIG. 1. Respectively identical features here have the same reference signs as in FIG. 1.

FIG. 3 and FIG. 4 show an alternative exemplary embodiment of a laser scanner 1", which corresponds to the laser scanner 1' in accordance with FIG. 2 except for the differences described below.

In contrast to the exemplary embodiment in accordance with FIG. 2, the deflecting mirrors 21, 22, 27 are situated, as a reflector 28, on the side of the micromirror 6 that is remote from the optical transmitters 12, 13, 14. The outwardly located deflecting mirrors 21, 22 are here, analogously to the configuration in accordance with FIG. 2, assigned to the outer transmitted beams 3, 5. In addition, a separate deflecting mirror 27 is also assigned to the transmitted light beam 4, which is arranged centrally in the row of the transmitted light beams.

The three deflecting mirrors 21, 22, 27 together form a reflector 28, which reflects the incident transmitted light beams 3, 4, 5 onto the micromirror 6, which is located between the reflector 28 and the transmitting unit 2. The micromirror 6 is arranged outside the plane 18 of the transmitted light beams 3, 4, 5. To this end, the reflector 28, or the individual deflecting mirrors 21, 22, 27, are arranged at an inclination angle β with respect to the plane 18 of the transmitted light beams 3, 4, 5. As can be seen from the side view of the laser scanner 1" in the plane of the transmitted light beams 3, 4, 5, the transmitted light beams are reflected upwardly by the deflecting mirrors 21, 22, 27 and directed onto the micromirror 6. The deflecting mirrors 21, 22, 27 and also the micromirror and the collimator lenses 24, 25, 26 and also the distance between the optical axes 16, 17, 18 form an optical system that is configured and adapted to the individual components such that the micromirror 6 emits the transmitted light beams 3, 4, 5 into the environment of the laser scanner 1" with the desired divergence and the angular distance α between mutually neighbouring transmitted light beams 3, 4, 5.

The invention claimed is:

1. A laser scanner for motor vehicles, comprising:

at least two optical transmitters for emitting in each case one transmitted light beam onto a scene to be measured, the at least two optical transmitters comprising a first outwardly located optical transmitter, a centrally located optical transmitter, and a second outwardly located optical transmitter; and an optical deflecting device arranged in a beam path of at least one transmitted light beam upstream of a micromirror the optical deflecting device comprising a first deflecting mirror and a second deflecting mirror and being configured and arranged such that corresponding transmitted light beams are guided onto the micromirror, wherein the at least two optical transmitters are arranged in a row such that the first deflecting mirror is assigned to the first outwardly located optical transmitter and the second deflecting mirror is assigned to the second outwardly located optical transmitter, and wherein the deflecting mirrors are arranged and oriented relative to the respectively assigned optical transmitters such that a first transmitted light beam from the first outwardly located optical transmitter via the first deflecting mirror and a second transmitted light beam from the second outwardly located optical transmitter via the second deflecting mirror are reflected onto the micromirror at a specified non-zero angular distance with respect to a centrally transmitted light beam from the centrally located optical transmitter.

2. The laser scanner according to claim 1, wherein the deflecting device has a deflecting mirror for each of the transmitted light beams assigned to said deflecting device.

3. The laser scanner according to claim 1, wherein the deflecting mirrors are situated, as a reflector, such that the micromirror is located between the reflector and the optical transmitters.

4. The laser scanner according to claim 1, wherein the optical transmitters are configured in the form of lasers.

5. The laser scanner according to claim 1, wherein arranged downstream of each optical transmitter is a respective collimator lens.

* * * * *